Patented Jan. 12, 1926.

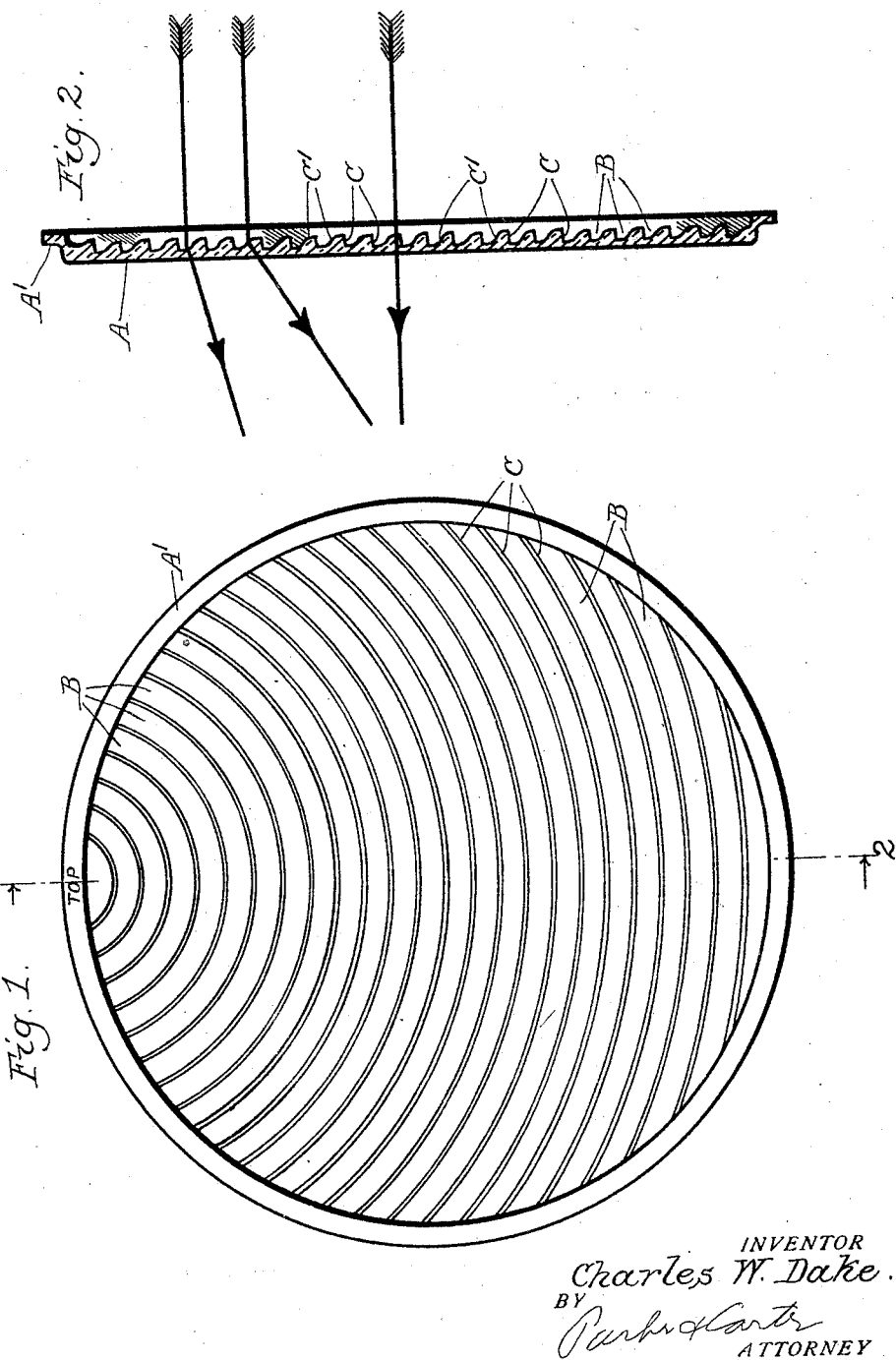

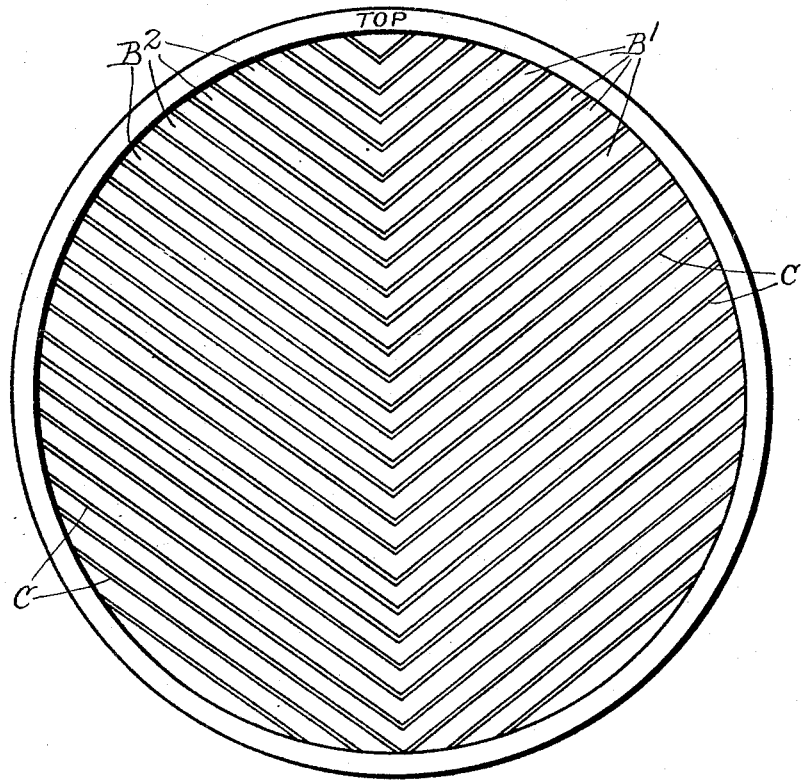

1,569,217

UNITED STATES PATENT OFFICE.

CHARLES W. DAKE, OF CHICAGO, ILLINOIS.

LENS FOR HEADLIGHTS.

Application filed February 23, 1923. Serial No. 620,563.

To all whom it may concern:

Be it known that I, CHARLES W. DAKE, a citizen of the United States, residing at Chicago, in the county of Cook and State of Illinois, have invented a certain new and useful Improvement in Lenses for Headlights, of which the following is a specification.

My invention relates to improvements in lenses for use in connection with locomotive electric headlights and has for one object to produce a lens which will diffuse and spread the light beam received from the reflector both downwardly on the road or track and outwardly or laterally to the side but which will prevent the discharge of any appreciable quantity of light above the focal axis of the reflector.

I have found that if the light rays after passing through the lens are broken up by causing them to intersect indiscriminately the lighting value of the beam is greatly diminished and I provide therefore a lens wherein the rays are deflected but wherein there is a minimum of intersection of light rays.

In my preferred form I show a lens wherein are disposed a number of preferably concentric sawtooth-like refracting ridges, the center about which they are grouped being at the top of the lens, the teeth being bounded by generally cylindrical though slightly inclined and therefore conical lower walls and upwardly and rather sharply inclined upper walls so that as the light rays pass through, while some of them pass straight on, others engaging the inclined walls are deflected downwardly and outwardly in radial planes to illuminate the road immediately in front of the light and at the sides.

My invention is illustrated more or less diagrammatically in the accompanying drawings, wherein—

Fig. 1 is a front elevation.

Fig. 2 is a section along line 2—2 of Fig. 1.

Fig. 3 is a plan view of a modified form.

Like parts are indicated by like characters in the drawing.

The lens disc A is flanged at A' or mounted in the headlight housing. One face of the disc is provided with a series of concentric corrugations B. These corrugations are as shown actually concentric and curved. They might be parabolic elliptic or any other curvature and they might be inclined one to another but the concentric arrangement is preferable. Figure 3 shows a modified form where the corrugations B' B² are inclined and intersect the kind of herring bone pattern. The effect is similar in each case because a tangent to the curved ridge at one side is inclined to a tangent taken at the corresponding other side of the lens and therefore, the effect on the light rays is generally the same in the devices of Figure 1 and Figure 3.

It will be noted that each of these ridges or corrugations is bounded on the underside by a straight substantially horizontal, though perhaps slightly inclined, wall C and that the wall boundary of the ridge comprises a curved wall C' which is at first substantially perpendicular to the top of the wall C, curves back in a reversed curve to a point where it is substantially perpendicular to the face of the wall C on the next ridge.

Generally speaking, the larger area of each rib or ridge is curved. The rays passing through this curved portion of the rib are deflected in a plane passing through the center of rotation about which all the ribs or ridges are formed and is downwardly deflected in this plane. Towards the outer extremities of the upper two quarters of the lens, this plane is sharply inclined to the horizontal and therefore a very considerable part of the light is outwardly as well as downwardly deflected.

I claim:

In a lens for headlights and the like, a plurality of corrugations extending outwardly and upwardly from the central vertical axis of the lens, each individual corrugation comprising a wall substantially parallel to the line of approach of the rays, and a face extending from the top of one wall to the bottom of the next, comprising reversed curves meeting intermediate said walls, the portions of said face adjacent the walls forming relatively extended surfaces conforming substantially to planes perpendicular to the axis of approach of the rays.

Signed at Chicago, county of Cook and State of Illinois, this 19th day of February 1923.

CHARLES W. DAKE.